(12) United States Patent
Sukkar

(10) Patent No.: US 6,292,778 B1
(45) Date of Patent: Sep. 18, 2001

(54) TASK-INDEPENDENT UTTERANCE VERIFICATION WITH SUBWORD-BASED MINIMUM VERIFICATION ERROR TRAINING

(75) Inventor: Rafid Antoon Sukkar, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/183,720

(22) Filed: Oct. 30, 1998

(51) Int. Cl.[7] .................................................. G10L 15/14
(52) U.S. Cl. .......................................... 704/256; 704/249
(58) Field of Search .................................. 704/240, 254, 704/255, 256, 249, 250

(56) References Cited

U.S. PATENT DOCUMENTS

| 5,675,706 | * | 10/1997 | Lee et al. | 704/256 |
| 5,675,707 | | 10/1997 | Lee et al. | 395/2.65 |
| 5,717,826 | * | 2/1998 | Setlur et al. | 704/252 |
| 5,737,489 | * | 4/1998 | Chou et al. | 704/256 |
| 5,797,123 | * | 8/1998 | Chou et al. | 704/256 |
| 5,842,163 | * | 11/1998 | Weintraub | 704/240 |

OTHER PUBLICATIONS

H. Bourlard, B. D'hoore, and J.-M. Boite "Optimizing recognition and rejection performance in wordspotting systems," *Proc. ICASSP '94*. pp. 373–376, vol. 1, Apr. 1994.
R. A. Sukkar, C. H. Lee, and B. H. Juang. "A vocabulary independent discriminatively trained method for rejection of non–keywords in subword–based speech recognition," *Proc. Eurospeech '95*, pp. 1629–1632, Sep. 1995.
R. C. Rose and E. Lleida, "Speech recognition using automatically derived acoustic baseforms," *Proc. ICASSP '97*, pp. 1271–1274, Apr. 1997.
R. A. Sukkar, A. R. Setlur, M. G. Rahim, and C. H. Lee, "Utterance verification of keyword strings using Word–Based Minimum Verification Error (WB–MVE) training," *Proc. ICASSP '96*, vol. I, pp. 518–521, May 1996.
W. Chou, B. H. Juang, and C. H. Lee, "Segmental GPD training of HMM–based speech recognizer," *Proc. ICASSP '92*, vol. I, pp. 473–476, Apr. 1992.

* cited by examiner

*Primary Examiner*—Richemond Dorvil
*Assistant Examiner*—Angela Armstrong
(74) *Attorney, Agent, or Firm*—Neil R. Ormos

(57) ABSTRACT

An automated speech recognition system comprises a preprocessor, a speech recognizer, and a task-independent utterance verifier. The task independent utterance verifier employs a first subword acoustic Hidden Markov Model for determining a first likelihood that a speech segment contains a sound corresponding to a speech recognition hypothesis, and a second anti-subword acoustic Hidden Markov Model for determining a second likelihood that a speech segment contains a sound other than one corresponding to the speech recognition hypothesis. In operation, the utterance verifier employs the subword and anti-subword models to produce for each recognized subword in the input speech the first and second likelihoods. The utterance verifier determines a subword verification score as the log of the ratio of the first and second likelihoods. In order to verify larger speech units, the utterance verifier combines the subword verification scores to produce a word/phrase/sentence verification score, and compares that score to a predetermined threshold. The first and second verification-specific HMMs are discriminatively trained using a subword-based minimum verification error training technique.

24 Claims, 9 Drawing Sheets

| NUMBER | SYMBOL | EXAMPLE WORD |
|---|---|---|
| 1 | a | father |
| 2 | @ | bat |
| 3 | ^ | butt |
| 4 | c | bought |
| 5 | W | bough |
| 6 | x | again |
| 7 | Y | bite |
| 8 | b | bob |
| 9 | C | church |
| 10 | d | dad |
| 11 | D | they |
| 12 | E | bet |
| 13 | R | bird |
| 14 | e | bait |
| 15 | f | fief |
| 16 | g | gag |
| 17 | h | hag |
| 18 | I | bit |
| 19 | i | beat |
| 20 | J | judge |

| NUMBER | SYMBOL | EXAMPLE WORD |
|---|---|---|
| 21 | k | kick |
| 22 | l | led |
| 23 | m | mom |
| 24 | n | no |
| 25 | G | sing |
| 26 | o | boat |
| 27 | O | boy |
| 28 | p | pop |
| 29 | r | red |
| 30 | s | sis |
| 31 | S | shoe |
| 32 | t | tot |
| 33 | T | thief |
| 34 | U | book |
| 35 | u | boot |
| 36 | v | very |
| 37 | w | wet |
| 38 | y | yet |
| 39 | z | zoo |
| 40 | Z | measure |
| 41 | # | silence |

*FIG. 7*

TASK-INDEPENDENT UTTERANCE VERIFICATION WITH SUBWORD-BASED MINIMUM VERIFICATION ERROR TRAINING

FIELD OF THE INVENTION

The present invention relates to automatic speech recognition, and more particularly to automatic speech recognition systems and methods providing utterance verification in which a hypothetical result of a recognition operation on a speech sample is verified to determine whether such speech sample actually contains the output of the recognition step. Still more particularly, the invention relates to systems and methods for providing subword-based utterance verification and for training such systems using a minimum verification error approach.

BACKGROUND OF THE INVENTION

Telecommunications service providers and other organizations which provide telephone-based services to remote customers or users have historically relied on human operators or agents to act as an interface between the customer or user and whatever instrumentality is used by the organization to actually provide the service. For example, telephone service providers have long provided enhanced telephone services of various sorts to customers using human operators. The operator receives from the customer a request for a service (e.g. credit card billing for a telephone call) and operates a suitable interface to the telephone network to cause the requested service to be provided. In some cases, the operator may directly deliver the requested service (e.g., by announcing to the customer a requested directory listing or the like). Banks, airlines, government agencies, and other organizations provide services to customers and users in a similar manner.

It is expensive to deliver services using human operators or agents. Many service transactions do not require complex interaction between the customer and the operator or agent. Accordingly, service providers have developed automated systems for providing many of the services previously executed through human operators or agents, thereby reducing costs and reserving human operators for transactions requiring human assistance such as those involving complex customer interaction. Many automated service systems require the customer to interact by pressing keys on the telephone, which is inconvenient for many customers.

Accordingly, service providers and others have sought automated speech recognition (ASR) systems capable of receiving interaction from customers or users via the spoken voice for use in providing telephone-based services to callers. In order for ASR systems to be broadly applicable, they must be "speaker-independent"—i.e., capable of accurately recognizing speech from a large plurality of callers without being exposed in advance to the speech patterns of each such caller. Many such systems have been developed. One approach to the construction of such a system employs two main components: a recognition component which, given a sample of speech, emits as a hypothesis the most likely corresponding translation from the recognition component's predefined vocabulary of speech units; and a verification component, which determines whether the speech sample actually contains speech corresponding to the recognition component's hypothesis. The utterance verification component is used to reliably identify and reject out-of-vocabulary speech and extraneous sounds.

Several technologies have been developed to implement the recognition component in ASR systems, and several technologies, some similar and others non-similar to those used in recognition, have been used to implement the utterance verification component. The particular recognition technology employed in an ASR system does not necessarily dictate the technology used for utterance verification. It is generally not apparent, a priori, whether a selected recognition technology may be advantageously used with a particular utterance verification technology, or how two candidate technologies may be usefully married to produce a working ASR system. Acceptable results have been obtained in ASR systems having recognition components which use acoustic speech models employing Hidden Markov Models (HMMs) as described in L. R. Rabiner and B. H. Juang, "An Introduction to Hidden Markov Models," *IEEE ASSP Magazine*, January 1986, pp. 4–16.

Various recognition and utterance verification components have employed models based on relatively large speech units, such as words or phrases. In a given ASR system, the utterance verification component typically employs speech units equivalent in size to that employed by the recognition component because the units output from the recognition component are supplied to the utterance verification component. U.S. Pat. No. 5,717,826, and R. A. Sukkar, A. R. Setiur, M. G. Rahim, and C. H. Lee, "Utterance Verification of Keyword Strings Using Word-Based Minimum Verification Error (WB-MVE) training," Proc. ICASSP '96, Vol. I, pp. 518–521, May 1996, disclose ASR systems providing utterance verification for keyword strings using word-based minimum verification error training.

Systems which employ large speech units generally require that the recognition component and the utterance verification component be trained for each speech unit in their vocabularies. The need for training for each speech unit has several disadvantages. In order for the ASR system to be speaker independent, speech samples for each large unit (e.g., whole words and/or phrases) must be obtained from a plurality of speakers. Obtaining such data, and performing the training initially, is resource intensive. Moreover, if a speech unit must be later added to the vocabulary, additional samples for that must be obtained from a plurality of speakers.

It is believed that most human languages employ a limited number of basic speech sounds which are concatenated to form words, and that speech in most such languages may be suitably represented by a set of basic speech sounds associated with that language. The basic speech sound units are often referred to as phonemes or "subwords." In order to avoid the disadvantages of ASR systems based on large speech units, there have been systems developed which are based on subwords. In subword-based systems, the results from the recognition component may be available as a string of recognized subwords, and a concatenated group of recognized subwords between two periods of silence may represent a word, phrase, or sentence. One of the main features of subword-based speech recognition is that, if the acoustic subword models are trained in a task independent fashion, then the ASR system can reliably be applied to many different tasks without the need for retraining. If the ASR system is to be used to recognize speech in a language for which it was not originally trained, it may be necessary to update the language model, but because the number of unique subwords is limited, the amount of training data required is substantially reduced.

It is generally not apparent, a priori, whether a selected recognition or utterance verification technology which works well for a given speech unit size may be advantageously applied to speech units of a different size. Moreover, the best ways of performing utterance verification on individual subwords, of applying the results therefrom in a meaningful way to words, phrases, or sentences formed by concatenating recognized subwords, and of training subword based utterance verification models, are still being explored.

Certain methods for task independent utterance verification have been proposed. For example in H. Bourlard, B. D'hoore, and J. -M. Boite "Optimizing Recognition and Rejection Performance in Wordspotting Systems," *Proc. ICASSP '94*. pp. 373–376, Vol. 1, April 1994, and in R. C. Rose and E. Lleida, "Speech Recognition Using Automatically Derived Acoustic Baseforms," *Proc. ICASSP '97*, pp. 1271–1274, April 1997, an "on-line garbage" likelihood is computed and a likelihood ratio is then formed between the "on-line garbage" likelihood and the likelihood of the recognized word, phrase, or sentence. In R. A. Sukkar, C. H. Lee, and B. H. Juang. "A Vocabulary Independent Discriminatively Trained Method for Rejection of Non-Keywords in Subword-Based Speech Recognition," *Proc. Eurospeech '95*, pp. 1629–1632, September 1995, a linear discriminator is defined and trained to construct a subword level verification score that is incorporated into a string (sentence) level verification score.

U.S. Pat. No. 5,675,706 also discloses an ASR system employing subword-based recognition and verification. The recognition stage employs subword-based HMM acoustic models. The utterance verification stage has a verifier which employs both a linear discriminator analyzer and HMM "antisubword" models to reject out-of-vocabulary sounds. Although the linear discriminator analyzer is discriminatively trained, the anti-subword HMM models are not discriminatively trained. Rather, each subword is assigned to one of a few subword classes, and an anti-subword model for each class is trained using all speech segments corresponding to sounds that are not modeled by any of the subwords in that subword class.

Another method that has been used is based on forming a likelihood ratio test between the likelihood of a free subword decoder and the likelihood of the recognized sentence. (See the above-cited papers by Sukkar, Lee, and Juang; and Rose and Lleida.)

U.S. Pat. No. 5,675,706 also discloses a verifier which uses a likelihood ratio test. A string-level verification stage determines for each string output by the recognition stage a first string-level verification score derived from the verification scores of each of the individual subwords from which the string is comprised, and a second anti-verification (or rejection) score derived from the anti-verification score of each subword. The subword verification and anti-verification scores are obtained using a linear discriminator. These scores are not likelihoods and thus cannot be directly used in a likelihood ratio test. In order to obtain likelihoods, the probability density functions associated with these scores are modeled by Normal distributions. The mean and variance of the verification function for each subword is estimated from the training set of sample sentences.

Although the aforementioned ASR systems may be sufficiently reliable for some applications, they are not sufficiently reliable for all applications, and even in applications for which existing systems are deemed adequate, improved recognition and verification accuracy is always desirable.

OBJECTS AND SUMMARY OF THE INVENTION

It is therefore an object of the present invention to provide a system and methods for automatic speech recognition, task-independent utterance verification, which overcome the disadvantages of the prior art.

According to an aspect of the present invention, there is provided an automatic speech recognition (ASR) system having a speech information preprocessor, a speech recognition component, and an utterance verification component. The speech information preprocessor receives digitized speech information, performs a spectral analysis on the speech information, and produces a set of "feature vectors" which effectively describe certain information which is contained in the speech signal and which is relevant in ASR.

The recognition component receives the feature vectors produced by the speech information preprocessor. The recognition component has associated therewith a set of recognition-specific subword acoustic Hidden Markov Models (HMMs) which are trained to recognize a selected set of subword sounds corresponding to the language (or languages) to which the ASR system is to be applied. The recognition component recognizes individual subwords in the input speech. In conjunction with recognizing a string of subword sounds from sampled speech, the recognition component consults a word lexicon database to determine a word, phrase or sentence in its vocabulary that most likely corresponds to the input speech. The recognition component emits the selected most-likely word, phrase, or sentence as a word/phrase/sentence hypothesis. The recognition component also emits subword segmentation information describing the temporal position of subword segment boundaries in the sampled speech.

The utterance verification component receives the feature vectors, the word/phrase/sentence hypothesis, and the subword segmentation information, and produces a reject/accept signal indicating its determination of whether the speech sample contains the word/phrase/sentence hypothesis emitted by the recognition component. The utterance verification component incorporates a subword-level verification subcomponent, a combiner subcomponent, and a threshold subcomponent.

Associated with the subword-level verification subcomponent is a first set of verification-specific subword HMMs, and a second set of verification-specific anti-subword HMMs. As discussed further in greater detail, the HMMs associated with the subword-level verification subcomponent are distinct from those associated with the recognition component and are verification-specific in the sense that they are discriminatively trained using a minimum verification error technique to perform the utterance verification task (as opposed to, for example, recognition). The subword-level verification subcomponent receives the input speech, the word/phrase/sentence hypothesis, and the subword segmentation information and emits for each subword a subword verification score representing a determination of whether the speech segment associated with the recognized subword contains the subword hypothesis emitted by the recognition component.

The subword verification score is determined as a ratio of the likelihood that the speech segment contains the sound associated with the subword hypothesis to the likelihood that the speech segment consists of a different sound. The subword verification scores for a selected speech unit (e.g., a word, phrase, or sentence) are supplied to the combiner subcomponent which combines the subword verification scores to produce a word/phrase/sentence verification score for the speech unit. For example, the combiner may perform an averaging operation. A threshold component compares the word/phrase/sentence verification score to a selected verification threshold. If the score exceeds the threshold, the threshold subcomponent emits an "accept" signal indicating a determination that the speech sample contains the word/phrase/sentence hypothesis emitted by the recognition component. If the score does not exceed the threshold, the threshold subcomponent emits a "reject" signal indicating a determination that the speech sample does not contain the word/phrase/sentence hypothesis emitted by the recognition component.

According to another aspect of the invention, the verification specific HMMs are distinct from the recognition HMMs and are discriminatively trained to determine their parameters using a subword-based minimum verification error technique. The verification models are trained using a general phonetically balanced database that is independent of the application tasks. The goal of the discriminative training procedure is, in the case of a correct recognition, to make a likelihood value, determined from the verification-specific subword HMM model, and tending to indicate correct recognition, large compared to a likelihood value determined from the verification-specific anti-subword HMM model and tending to indicate misrecognition. In the case of a misrecognition, the goal of the discriminative training procedure is to make a likelihood value, determined from the anti-subword HMM model, and tending to indicate misrecognition, large compared to a likelihood value determined from the subword HMM model and tending to indicate correct recognition.

The training procedure iteratively adjusts the parameters of the verification-specific HMMs by minimizing a defined distance function in the case of a correct recognition and maximizing such distance function in the case of a misrecognition. The distance function is determined as the log of the inverse subword likelihood ratio (i.e., the log of an inverse of the ratio of the likelihood value from the anti-subword model to the likelihood value from the subword model for a particular speech segment). The distance function is optimized using the generalized probabilistic descent function.

Task independence is accomplished by training the verification-specific HMMs using a general phonetically balanced subword database. Advantageously, the resulting verification-specific HMMs can be used to perform utterance verification for any recognition task without the need for retraining, provided that the set of subwords remains the same.

Experimental results show that a system constructed according to the present invention significantly outperforms two other commonly used task independent utterance verification techniques. In particular, the equal error rate of false alarms and false keyword rejection is reduced by more than 22% compared to the other two methods on a large vocabulary recognition task.

BRIEF DESCRIPTION OF THE DRAWINGS

These and other features of the invention will be best understood by reference to the following detailed description of a preferred embodiment of the invention, taken in conjunction with the accompanying drawings, in which:

FIG. 7 is a table illustrating an assignment of subword to speech sounds in the English language, as may be used in conjunction with the speech recognizer of FIGS. 1–3;

DETAILED DESCRIPTION OF THE PREFERRED EMBODIMENTS

Figure 1:
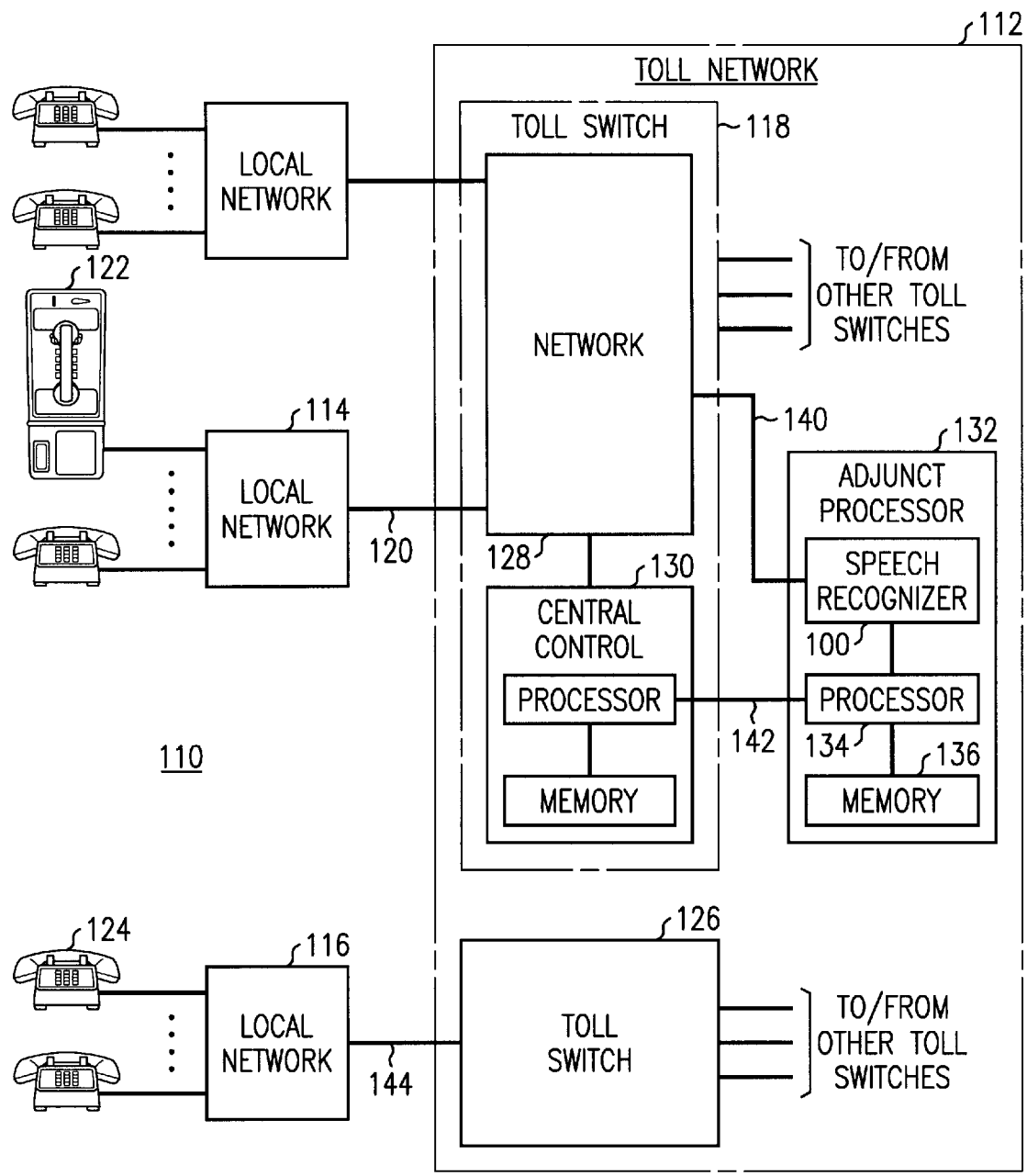
FIG. 1 is block diagram of a telephone network depicting a toll switch equipped with an adjunct processor incorporating an exemplary embodiment of a speech recognizer constructed in accordance with the present invention, the figure illustrating an exemplary application environment in which the present invention may be applied.

FIG. 1 is block diagram of a portion of a telephone network 110 illustrating an exemplary application environment in which the present invention may be advantageously employed. Although an exemplary embodiment of the invention is discussed herein to illustrate the features and operation of the invention, the invention is susceptible of a wide variety of other uses, applications, and embodiments. Accordingly, the invention, as defined by the claims appended hereto, is not intended to be limited to the exemplary embodiment and application environment discussed herein, but rather is intended to cover all embodiments, applications, and modifications thereof consistent with the true scope and spirit of the invention.

As best seen in FIG. 1, the telephone network 110 may include a toll network 112 and one or more local networks, e.g. local networks 114 and 116. Local networks 114 and 116 are connected to toll network 112 using suitable transport facilities 120 and 144, respectively. The transport facilities 120 and 144 may be conventional telephone trunks (including those provided on carrier systems), and may also be any other suitable facilities for carrying telephony traffic, such as ATM links, IP links, or the like. The toll network 112 may include first and second toll switches 118, 126. Toll switch 118 is depicted in greater detail.

The toll switch 118 preferably comprises a switching network 128 operatively coupled to a central control 130, including a processor and memory, as is well known in the telecommunications switching art. The switching network 128 operates under the supervision of the central control 130 to form interconnections between trunks, lines, and other interconnection facilities, as instructed by the central control 130.

An adjunct processor 132, adapted for providing one or more services involving automatic speech recognition (ASR), such as automated operator services, is connected to at least one of the toll switches, such as toll switch 118 as shown in FIG. 1. The adjunct processor preferably includes a suitable processor 134, memory 136 connected to the processor, and an exemplary embodiment 100 of a speech recognizer constructed according to an aspect of the present invention 100. As best seen in FIG. 1, the adjunct processor 132 preferably has a first connection 140 for receiving speech signals from the toll switch 118, and a second connection 142 for exchanging with toll switch 118 information of a control or supervisory nature, including results from the speech recognizer 100. The voice connection 140 may carry a plurality of voice circuits, and the control connection 142 may carry control information relating to a plurality of circuits and services. Although the adjunct processor 132 is shown connected to a single toll switch 118, it may be connected to provide services to a plurality of other toll switches and/or local switches (subject to regulatory limitations). The processor 134 and memory 136 of the adjunct processor 132 may be implemented using the facilities of any suitable general purpose computer. For example, the processor 134 and memory 136 may be implemented using an industry standard personal computer having an Intel PENTIUM or similar class processor operating at 150 MHz or higher, 128 MB (or greater) RAM, and suitable I/O and other peripherals. Such computers are generally commercially available. Other types of computers could also be used. The adjunct processor may have additional equipment (not shown), including peripheral equipment, for performing tasks in addition to speech recognition (e.g., for speech synthesis or announcements), for interfacing to other network equipment, and for providing "housekeeping," operating system, and other functions of a general-purpose computer.

Figure 2:
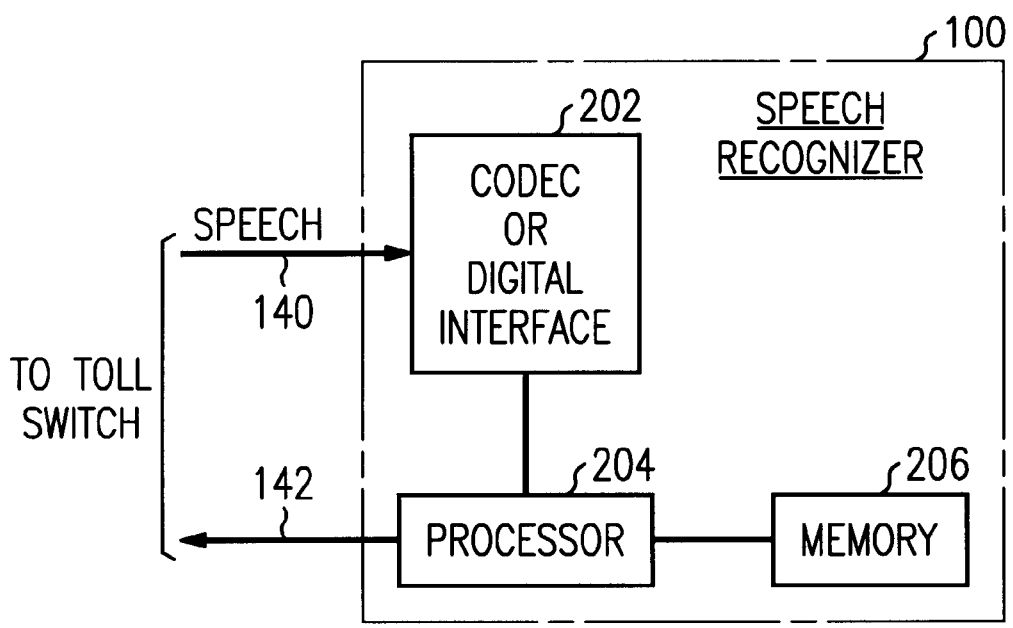
FIG. 2 is a block diagram showing at a first level the organization of an exemplary embodiment of a speech recognizer constructed according the present invention, as may be employed in the application of FIG. 1.

In an exemplary application, a user at a coin telephone 122 desiring to place an operator-assisted call may dial "00" to request operator assistance. The local network 114 recognizes the digit string "00" as a request for operator assistance to be provided by the toll network 112 and routes the call to toll switch 118 via facilities 120. The toll switch 118 routes the call via network 128 and connection 140 to speech recognizer 100 of adjunct processor 132. The toll switch 118 sends appropriate control information to the adjunct processor 132 via link 142, e.g., to inform the adjunct processor of the type and source of the call. The adjunct processor prompts the user to identify by voice the type of service requested. The speech recognizer 100 receives the speech information, and recognizes the service request. In response thereto, the adjunct processor may further prompt the user to recite some other information relating to the requested service, such as a telephone credit card number. The speech recognizer 100 receives the additional speech information, recognizes the additional information, and transmits a message to toll switch 118 informing it of the type of call requested and the credit card number or other additional information. The toll switch 118 responsively disconnects the call leg to the adjunct processor, and provides the requested service, e.g., by extending the call through toll switch 126, facilities 144, and local network 116, to telephone 124. FIG. 2 is a block diagram showing at a first level the organization of an exemplary embodiment of a speech recognizer 100 constructed according the present invention, as may be employed in the application of FIG. 1. The speech recognizer 100 comprises a speech signal interface 202, a processor 204, and a memory 206. The speech signal interface 202 is connected to speech signal line 140. The speech signal interface 202 may be implemented using suitable interface equipment according to the format of speech signals on lead 140. For example, if the speech signals on lead 140 are analog speech signals, interface 202 may be implemented using a codec or other analog-to-digital signal conversion means. If the speech signals on lead 140 are digitally-encoded voice signals, interface 202 may be implemented using an appropriate digital interface or format converter.

Processor 204 and memory 206 may be implemented using a suitable general-purpose computer, a programmable digital signal processing system, or, in some cases, special-purpose digital hardware. In some applications, the functions of processor 204 and memory 206 of the speech recognizer 100 could be implemented using the processor 134 and memory 136 of the adjunct processor. In a preferred embodiment, the speech recognizer 100 (including processor 204 and memory 206) may be implemented using a high-speed digital signal processor circuit module having an industry standard interface for installation in an interface slot of processor 204 of adjunct processor 132. A suitable digital signal processor circuit module is commercially available from Lucent Technologies Inc. under the designation "Lucent Speech Processing Board." Such circuit module provides three POWERPC 603 processors operating at 64 MHz or greater, with 48 MBytes of synchronous DRAM. Other suitable circuit modules, and other processors, could also be used.

Figure 3:
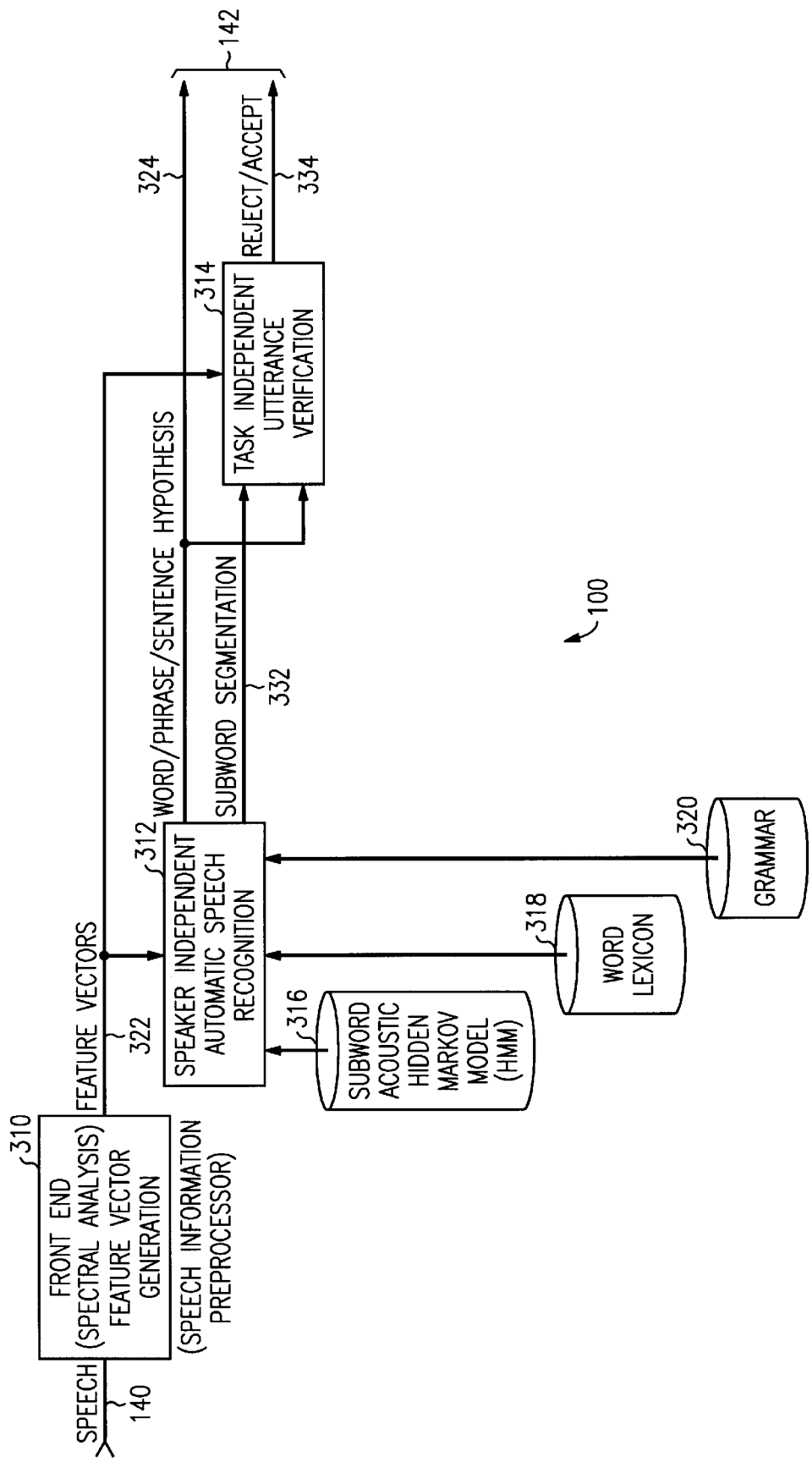
FIG. 3 is a block diagram showing in greater detail the organization of components of the speech recognizer of FIGS. 1–2.

FIG. 3 is a block diagram showing in greater detail the organization of a subword-based speech recognition system 100 constructed according to the present invention. To supplement the following discussion of the speech recognition system 100, an Appendix to this application presents a more detailed mathematical treatment of the theory and operation of the recognition system 100. The Appendix has been published as R. A. Sukkar, "Subword-Based Minimum Verification Error (SB-MVE) Training for Task Independent Utterance Verification," *Proceedings* 1998 *IEEE International Conf. on Acoustics, Speech and Signal Processing*, pp.229–232, May 1998. In the discussion herein, items referred to as "components" may be implemented using any appropriate means, including special-purpose hardware. In an exemplary embodiment, however, such components may be implemented as appropriate software executed by the processor 204. References herein to "signal paths" may refer to physical signal leads or busses, but may also refer to equivalent data paths or other information flow mechanisms.

As best seen in FIG. 3, the automatic speech recognition (ASR) system 100 comprises a speech information preprocessor 310, a speech recognition component 312 operatively connected the speech information preprocessor 310, and a task-independent utterance verification component 312 operatively connected to the speech information preprocessor 310 and the recognition component 312. The digitized speech information on path 140 may be presented in any suitable format. For example, the speech information may be presented in 8000 sample-per-second DS0 format. Other formats could also be used.

The speech information preprocessor 310 receives digitized speech information via signal path 140, performs a spectral analysis on the speech information corresponding to predetermined recurring intervals (or "speech frames"), and produces a set of speech "feature vectors" on signal path 322. This process effectively distills the time-domain speech signal into a limited number of speech feature vector elements (or speech feature signals) which describe distinctive or recognizable characteristics of the speech signal that are relevant in ASR. As a group, the feature vectors encode sufficient descriptive information about the speech signal that when processed in conjunction with suitable acoustic models, the speech content can be automatically recovered or "recognized". The speech information preprocessor emits a speech feature vector (or "recognizer feature vector") for each predetermined interval, or speech frame. In an exemplary embodiment, the recognizer feature vector preferably consists of the following 39 parameters or elements: 12 LPC-derived cepstral coefficients, 12 delta cepstral coefficients, 12 delta-delta cepstral coefficients, normalized log energy, and the delta and delta-delta of the energy parameter. These elements of the feature vector, and processes for analyzing speech information to produce the vector elements, are known in the art. Other parameters or feature elements, or a different number of them, could also be used, with appropriate modification of the speech information preprocessor and the downstream components.

The recognition component 312 receives the feature vectors 322 produced by the speech information preprocessor 322. The recognition component has associated therewith a set of recognition-specific subword acoustic continuous Hidden Markov Models (HMMs) 316 which are trained to recognize a selected set of subword sounds corresponding to the language (or languages) to which the ASR system is to be applied.

In a preferred embodiment, recognition component 312 employs a total of 40 context independent subword models and one silence model. Other selections of subword models could also be used. FIG. 7 is a table 710 illustrating an exemplary assignment of subwords to speech sounds in the English language, as may be used in conjunction with the speech recognizer 100. The appropriate selection of subword models may depend on the language to be recognized. In an exemplary embodiment, each subword model is represented by a 3-state continuous density HMM, where the maximum number of Gaussian mixtures is set to 16. The silence model is represented by a single state HMM with 32 mixtures. Other models could also be used for the subwords and for silence. In an exemplary embodiment, the recognizer feature vector consists of the following 39 parameters: 12 LPC-derived cepstral coefficients, 12 delta cepstral coefficients, 12 delta-delta cepstral coefficients, normalized log energy, and the delta and delta-delta of the energy parameter. Other feature vector selections, and a different number of them, could also be used.

The recognition model is preferably trained using a large database of speech collected from a plurality of speakers. In an experimental embodiment of the invention, a database used to train the recognition models consisted of 9865 phonetically balanced phrases and sentences collected over the public telephone network. Minimum classification error (MCE) training may be employed to train the recognition subword models, as described in W. Chou, B. H. Juang, and C. H. Lee, "Segmental GPD training of HMM-based speech recognizer," Proc. ICASSP '92, Vol. 1, pp. 473–476, April 1992.

The recognition component 312 recognizes individual subwords in the input speech. The recognition component 312 also has an associated word lexicon database 318 and a grammar database 320. The word lexicon database 318 represents a mapping between strings of subword sounds and vocabulary words, phrases, or sentences. The word lexicon database 318 contains a data structure describing the pronunciation, in terms of subword symbols, of each word in the system's vocabulary. The word lexicon database 318 may include plural pronunciations for some words. In conjunction with recognizing a string of subword sounds from sampled speech, the recognition component 312 consults the word lexicon database 318 to determine a word, phrase or sentence in its vocabulary that most likely corresponds to the input speech. The grammar database 320 is provided to enable the recognition component 312 to apply predefined rules of grammar in determining the most likely result for more complex speech units, such as phrases and sentences.

The recognition component 312 emits the selected most-likely word, phrase, or sentence on path 324 as a word/phrase/sentence hypothesis. The word/phrase/sentence hypothesis indicates what the recognizer recognized and includes text, comprising recognized elements selected from the lexicon 318, and the corresponding subword symbols (see FIG. 7). The recognition component also emits subword segmentation information on path 332 describing the temporal position of subword segment boundaries in the sampled speech.

The task-independent utterance verification component 314 receives the feature vectors on path 322, the word/phrase/sentence hypothesis on path 324, and the subword segmentation information on path 314, and produces a reject/accept signal on path 334 indicating its determination of whether the speech sample contains the word/phrase/sentence hypothesis emitted by the recognition component.

Figure 4:
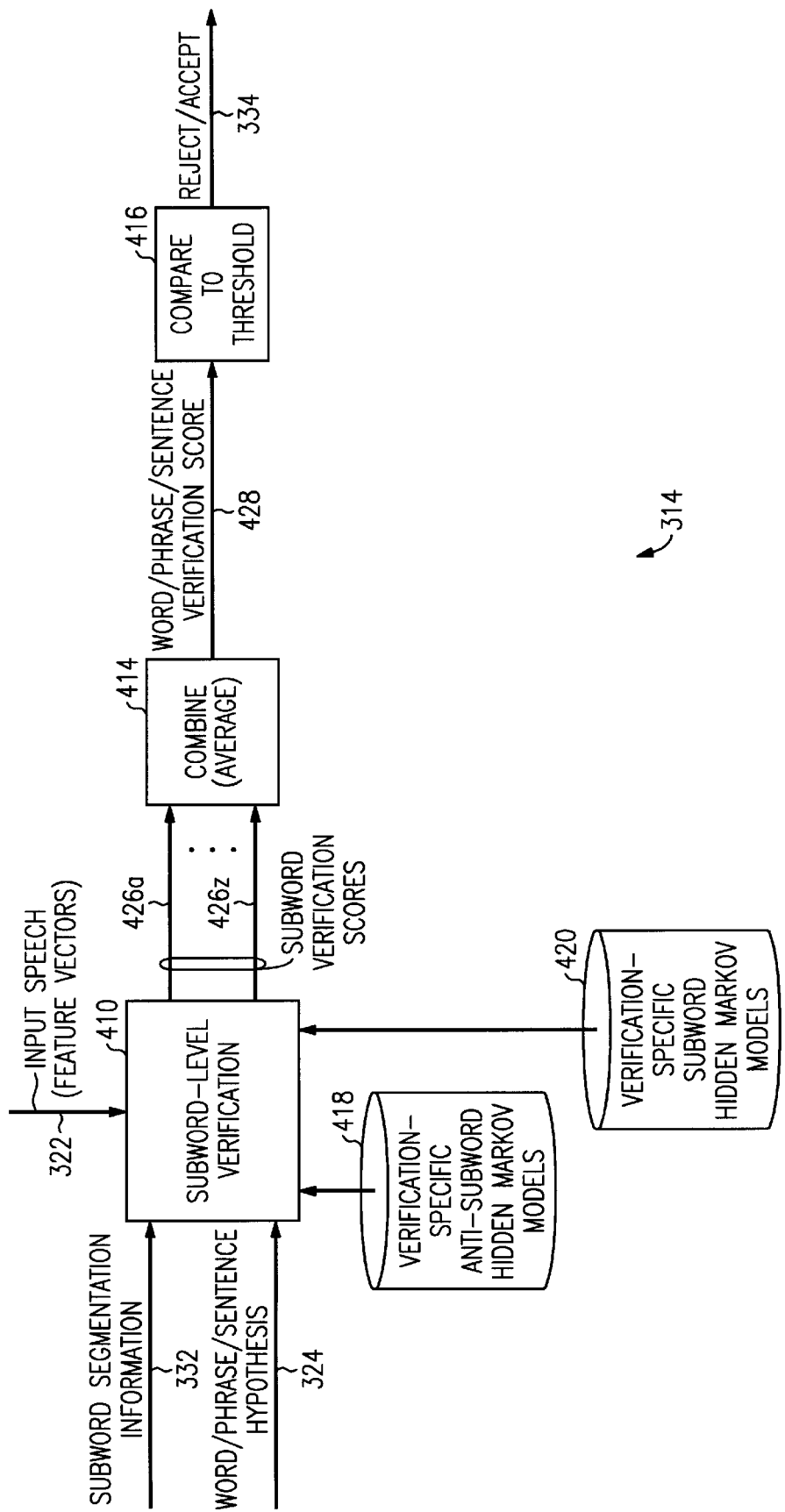
FIG. 4 is a block diagram showing the internal organization of a task-independent utterance verification component of the speech recognizer of FIGS. 1–3.

FIG. 4 is a block diagram showing in greater detail the internal organization of a task-independent utterance verification component 314 of the speech recognizer 100. As best seen in FIG. 4, the utterance verification component 314 incorporates a subword-level verification subcomponent 410, a combiner subcomponent 414 operatively coupled to the subword-level verification subcomponent 410, and a threshold subcomponent 416 operatively coupled to the subword-level verification subcomponent 414.

Associated with the subword-level verification subcomponent 410 is a first set of verification-specific subword HMMs 420, and a second set of verification-specific anti-subword HMMs 418. As discussed further in greater detail, the HMMs 418, 420 associated with the subword-level verification subcomponent 410 are distinct from the HMMs 316 (FIG. 3) associated with the recognition component 312 and are verification-specific in the sense that they are discriminatively trained using a minimum verification error technique to perform the utterance verification task (as opposed to, for example, recognition).

In an experimental embodiment, the verification model set for each subword was implemented as two continuous density HMMs, having a topology of 3 states with 8 Gaussian mixtures in each state. Therefore, there were a total of 80 verification HMMs corresponding to the 40 recognition subwords. A database consisting of 9865 phonetically balanced phrases and sentences collected over the public telephone network was used to train the verification models using the SB-MVE training procedure described further below.

The subword-level verification subcomponent 410 receives the input speech on path 322, the word/phrase/sentence hypothesis on path 324, and the subword segmentation information on path 332 and generates for each subword a subword verification score (supplied on paths 426a–426z) representing a determination of whether the speech segment associated with the subword contains the subword hypothesis emitted by the recognition component 324 (FIG. 3). The subword verification scores 426a–426z are determined as a ratio of the likelihood that the speech segment contains the sound associated with the subword hypothesis to the likelihood that the speech segment consists of a different sound. A scalar subword verification score is produced for each subword in the recognized hypothesis.

The subword verification scores 426a–426z for a selected speech unit (e.g., a word, phrase, or sentence) are supplied to the combiner subcomponent 414. The combiner subcomponent 414 combines the subword verification scores to produce a word/phrase/sentence verification score on path 428 for the speech unit. For example, the combiner preferably performs an averaging operation on the subword verification scores. However, other combining methods could also be used. The word/phrase/sentence verification score 428 is provided to a threshold subcomponent 416, which compares the score to a selected verification threshold. If the score satisfies the threshold, the threshold subcomponent 416 emits an "accept" signal on path 334 indicating a determination that the speech sample contains the word/phrase/sentence hypothesis 324 emitted by the recognition component 312 (FIG. 3). If the score does not satisfy the threshold, the threshold subcomponent 416 emits a "reject" signal on path 334 indicating a determination that the speech sample does not contain the word/phrase/sentence hypothesis 324 emitted by the recognition component 312. The sense of the threshold (i.e., whether the threshold is satisfied by excess or shortfall) depends on the method by which the verification score is calculated and the direction by which the score varies when correct recognition occurs. For example, if correct recognition causes the verification score to be higher than that caused by incorrect recognition, then the threshold must be exceeded to be satisfied.

Figure 5:
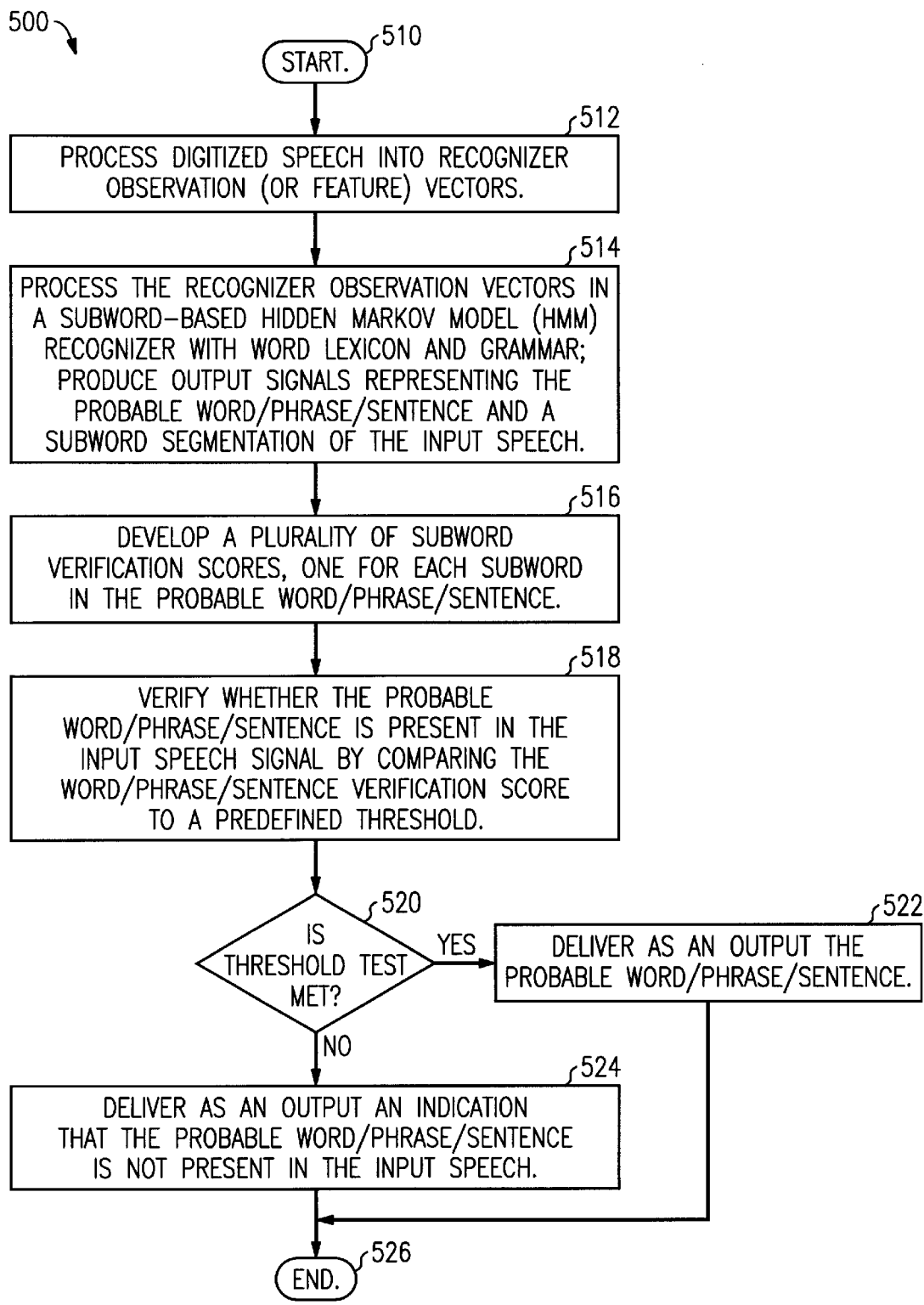
FIG. 5 is a flow diagram depicting an exemplary method of speech recognition and verification for use in conjunction with the speech recognizer of FIGS. 1–3.

According to another aspect of the invention, the verification specific HMMs 418 and 420 are discriminatively trained to determine their parameters using a subword-based minimum verification error technique. FIG. 5 is a flow diagram depicting an exemplary method 500 of speech recognition and verification for use in conjunction with the speech recognizer 100.

The method begins in step 510. In step 512, the speech information preprocessor receives speech information. If the speech information has not previously been digitized, the digitization step may occur in this step. The speech information preprocessor employs spectral and other analyses to process the digitized speech into recognizer observation or "feature vectors" as described above. In step 514, the recognition component processes the recognizer observation vectors in a subword-based Hidden Markov Model (HMM) recognizer with a word lexicon and grammar database. The recognition component responsively produces output signals representing the probable word/phrase/sentence selected from the word lexicon and a subword segmentation of the input speech.

In step 516 the utterance verification component develops a subword verification score for each subword in the word/phrase/sentence hypothesis. Also in this step, the individual subword verification scores for the speech unit are combined into a word/phrase/sentence verification score using, for example, a averaging process. Other combination methods could also be used.

In step 518, the threshold component verifies whether the word/phrase/sentence hypothesis is present in the input speech signal by comparing the word/phrase/sentence verification score to a predefined threshold. Step 520 is a branch. If the threshold test is met, then the method continues in step 522, in which the speech recognizer system 100 delivers as a verified output the word/phrase/sentence hypothesis produced by the recognition component. Then, the method ends in step 526. If, in step 520, the threshold test is not met, then the method continues in step 524, in which the speech recognizer system 100 delivers an indication that the word/phrase/sentence hypothesis is not present in the input speech. Then, the method ends in step 526.

Figure 6A:
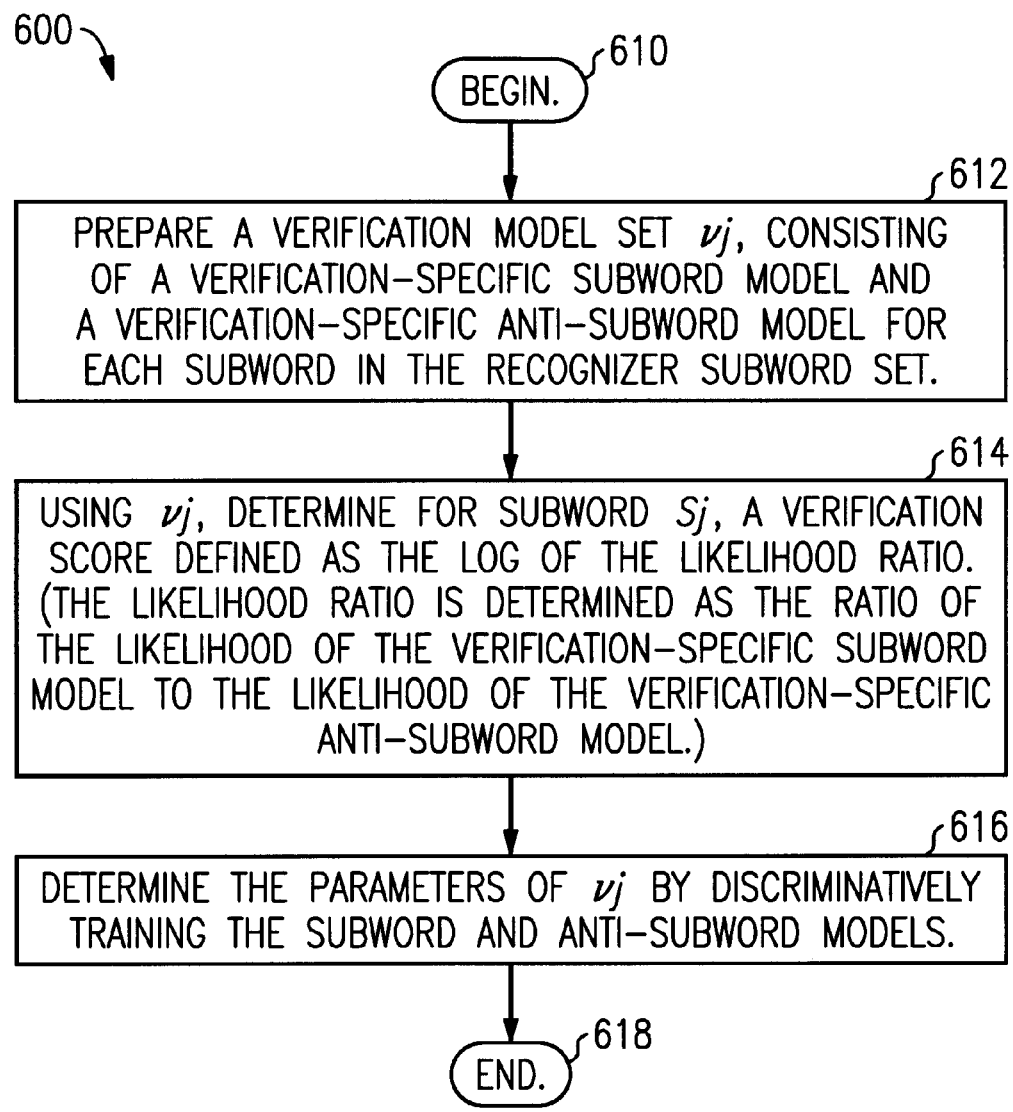
FIG. 6a is a flow diagram depicting an exemplary method of subword-based verification training for use in conjunction with the task-independent utterance verification component of FIG. 4.

FIG. 6a is a flow diagram depicting an exemplary method 600 of subword-based verification training for use in conjunction with the task-independent utterance verification component of FIG. 4. The method begins in step 610. In step 612, a verification model set Vj is prepared. The verification model set consists of a verification-specific subword model and a verification-specific anti-subword model for each subword in the recognizer subword set.

In step 614, a verification score is determined for each subword sj, using the verification model set Vj. The verification score is defined as the log of a likelihood ratio determined as the ratio of the likelihood of the verification-specific subword model to the likelihood of the verification-specific anti-subword model. In step 616, the parameters of the verification model set Vj are determined by discriminatively training the subword and anti-subword models. The process of discriminatively training the models is discussed further in detail in connection with FIG. 6b. The method ends in step 618.

Figure 6B:
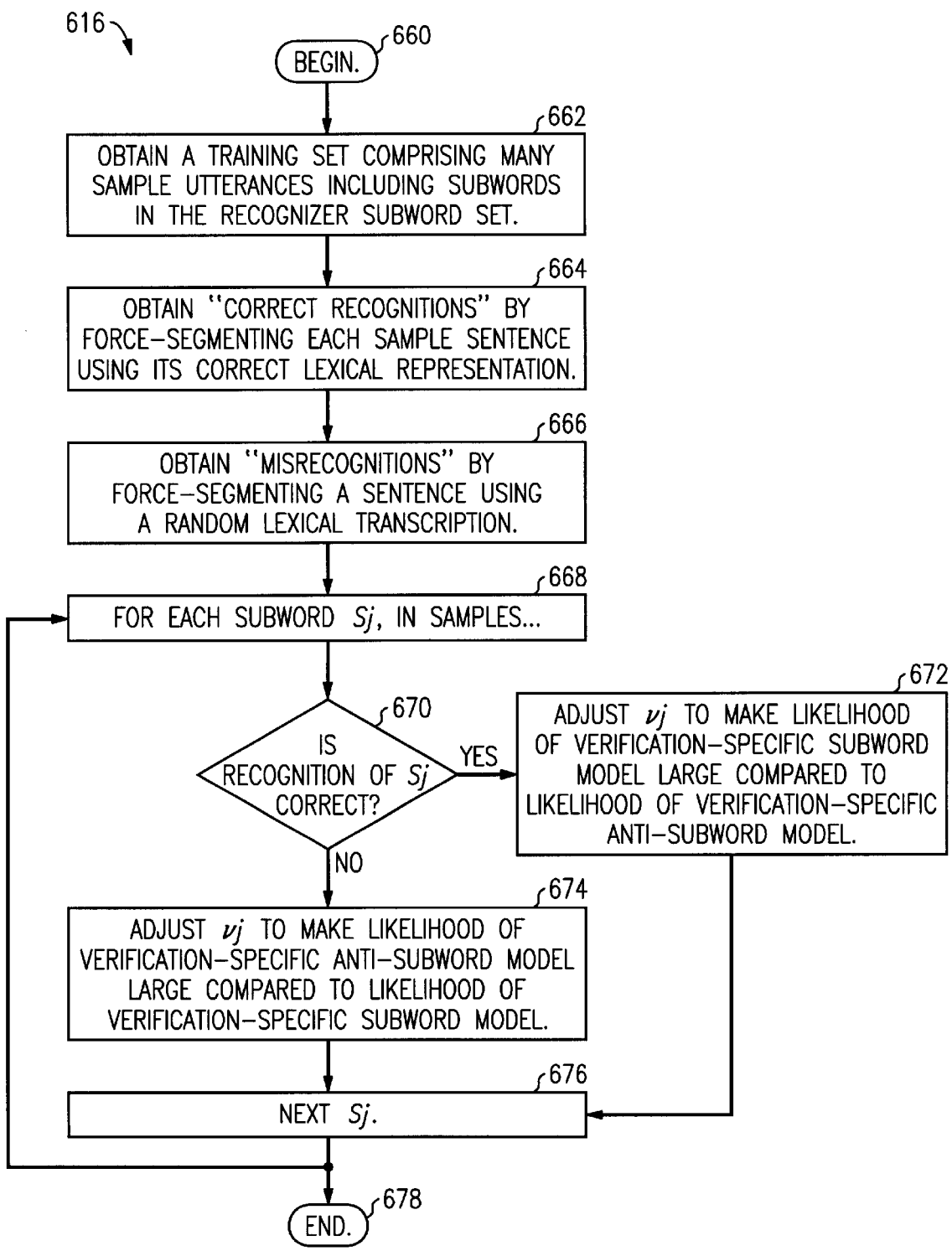
FIG. 6b is a flow diagram depicting subcomponent of the exemplary method of subword-based verification training of FIG. 6a, for use in conjunction with the task-independent utterance verification component of FIG. 4.

FIG. 6b is a flow diagram depicting in greater detail the discriminative training subcomponent 616 of the exemplary method 600 of subword-based verification training. The method begins in step 660. The verification models are preferably trained using a general phonetically balanced database that is independent of the application tasks. Accordingly, in step 662, a training set is obtained which comprises many sample utterances including subwords in the recognizer subword set.

Correct recognitions are obtained during SB-MVE training by force segmenting a given sentence using its correct lexical transcription (step 664). Misrecognitions are obtained by force segmenting a given sentence using a random lexical transcription (step 666).

In step 668, a loop is established in which each subword Sj, in the speech sample is selected in turn for further processing.

The goal of the discriminative training procedure is, in the case of a correct recognition, to make the likelihood as determined from the subword HMM model that a proffered speech segment contains the sound associated with the subword hypothesis large compared to the likelihood as determined from the anti-subword HMM model that the segment contains a different sound. In the case of a misrecognition, the goal of the discriminative training procedure is to make the likelihood (as determined from the anti-subword HMM model) that the segment contains a different sound compared to the likelihood (as determined from the subword HMM model) that a proffered speech segment contains hypothetical sound.

A distance function is determined as the log of the inverse subword likelihood ratio. The training procedure iteratively adjusts the parameters of the verification-specific HMMs by minimizing the distance function in the case of a correct recognition and maximizing the distance function in the case of a misrecognition. The distance function is optimized using the generalized probabilistic descent function described in W. Chou, B. H. Juang, and C. H. Lee, "Segmental GPD Training of HMM-Based Speech Recognizer," Proc. ICASSP '92, Vol. I, pp. 473–476, April 1992.

Accordingly, step 670 is a branch, in which the system determines whether the recognition of the selected Sj was correct. If the recognition was correct, then the method continues in step 672, in which the parameters of V/j are adjusted using the aforementioned GPD method to make the likelihood of the verification-specific subword model large compared to the likelihood of the verification-specific anti-subword model. Then the method jumps to step 676. If further subwords Sj are available among the training samples, then the method returns to step 668; otherwise the method ends at step 678.

If in step 670 the recognition was not correct, then the method continues in step 674, in which the parameters of Vj are adjusted using the aforementioned GPD model to make the likelihood of the verification-specific anti-subword model large compared to the likelihood of the verification-specific subword model. Then the method jumps to step 676. If further subwords Sj are available among the training samples, then the method returns to step 668; otherwise the method ends at step 678.

The task independence of the speech recognizer 100 of the present invention is accomplished by training the verification-specific HMMs using a general phonetically balanced subword database. Advantageously, the resulting verification-specific HMMs can be used to perform utterance verification for any recognition task without the need for retraining, provided that the set of subwords remains the same.

Experimental results show that the speech recognizer 100, in conjunction with the methods practiced according to the present invention, significantly outperforms two other commonly used task independent utterance verification techniques. In particular, the equal error rate of false alarms and false keyword rejection is reduced by more than 22% compared to the other two methods on a large vocabulary recognition task.

This speech recognizer 100 and associated methods were evaluated on a company name recognition task, the goal of which is to recognize the name of a company out of 6963 possible names. The average number of words per company name is 3.7 words and the average number of subword units per company name is 18.9 units. The lexical transcription of each company name was obtained using a text-to-speech front end. A total of 40 context independent subword models and one silence model were used in the recognition phase. Each subword model was represented by a 3-state continuous density HMM, where the maximum number of Gaussian mixtures was set to 16. The silence model was represented by a single state HMM with 32 mixtures. The recognizer feature vector consisted of the following 39 parameters: 12 LPC-derived cepstral coefficients, 12 delta cepstral coefficients, 12 delta-delta cepstral coefficients, normalized log energy, and the delta and delta-delta of the energy parameter. The database used to train these recognition models consisted of 9865 phonetically balanced phrases and sentences collected over the public telephone network. Minimum classification error (MCE) training was employed to train the recognition subword models [5].

The above-described phonetically balanced database was also used to train the verification models using the subword-based minimum verification error (SB-MVE) training procedure disclosed above. The verification model set, Vj for a given subword consists of two continuous density HMMs having a topology of 3 states with 8 Gaussian mixtures in each state. Therefore, there were a total of 80 verification HMMs corresponding to the 40 recognition subwords.

The company name database used for performance evaluation is independent of the phonetically balanced database used in the training phase. This testing database was collected over the public telephone network and consists of 11552 utterances spoken by 2500 different speakers covering the 6963 company names. Since the performance of the utterance verification component was of interest, it was necessary to define a separate database consisting of out-of-vocabulary speech. A database consisting of 10511 utterances of speakers saying their first and last names, collected aver the public telephone network, was used.

Figure 8:
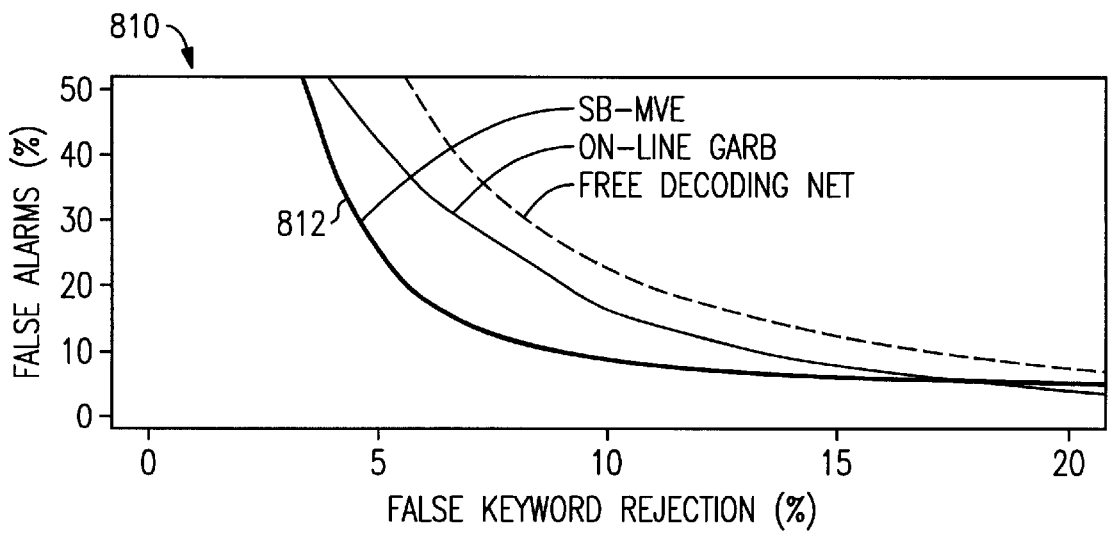
FIG. 8 is a graph showing a comparison of the false-alarm performance of an experimental embodiment of a speech recognizer constructed according to the present invention with two prior-art speech recognizers.
Figure 9:
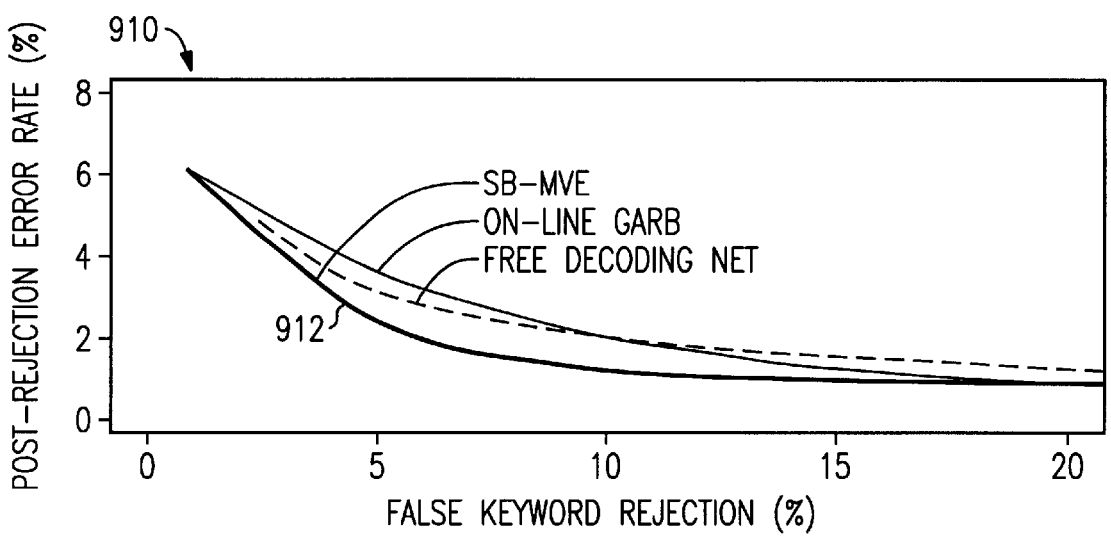
FIG. 9 is a graph showing a comparison of the post-rejection error rate performance of an experimental embodiment of a speech recognizer constructed according to the present invention with two prior-art speech recognizers.

Prior to the utterance verification stage. the recognition rate on the company name database was 93.1%. The utterance verification performance is shown in FIGS. 8 and 9. FIG. 8 shows the false acceptance rate (false alarms) of the out-of-vocabulary utterances as a function of the false rejection rate of the company name utterances. Since successful recognition requires not only correct verification but also correct classification, FIG. 9 shows the recognizer substitution error rate on non-rejected company names versus false rejection rate. By fixing the false rejection rate, the recognizer operating point can be determined by identifying the corresponding false alarm and substitution error rates. The SB-MVE performance at any given operating point is obtained by evaluating the verification score, and comparing the results to a predefined threshold.

FIGS. 8 and 9 also compare the performance of the SB-MVE method to two other utterance verification methods. The first is very similar to the on-line garbage method, proposed in the above-cited Bourlard, D'hoore, and Boite paper and also evaluated in the Rose and Lleida paper. To obtain the results shown herein, the on-line garbage verification score for a given recognized company name is computed by averaging the on-line garbage scores of the subwords constituting the recognized company name excluding any silence segments. (The SB-MVE method also excludes all silence segments when computing the verification score.)

The second method with which comparison was made a verification HMM network parallel to the HMM network defined by the company name lexicon. The verification network acts as the out-of-vocabulary network and consists of a self loop of all the subword and silence models in the recognizer model set. In effect, this out-of-vocabulary network results in a "free-subword" maximum likelihood HMM decoding of the input speech utterance. The verification score is defined as a log likelihood difference between the likelihood of the recognized company name and the likelihood of the non-keyword network.

FIGS. 8 and 9 demonstrate that the SB-MVE method significantly outperforms the other methods in two areas. First, the SB-MVE method results in a false alarms rate that is consistently lower than the other two methods. Second, the post-rejection substitution error rate is also lower, implying that the SB-MVE method is more likely than the other two methods to reject substitution errors, a very desirable property for many applications. Fixing the false rejection rate at 7.0% and 10.0%, Table 1 shows a comparison of the utterance verification performance of the three methods. These results were obtained from the plots of FIGS. 8 and 9. Another point of interest is the equal error rate (EER) of false alarms and false rejections. Table 2 compares the equal error rates of the three methods and shows that the SB-MVE method results in an EER that is 22.0% lower than the on-line garbage method and 32.8% lower than the free decoding network method.

The free decoding method is much more computationally intensive that either the SB-MVE or the on-line garbage method. On the other hand the difference in computational complexity between the SB-MVE and on-line garbage method is relatively small. The SB-MVE method does, however, require additional model storage capacity compared to the other two methods for storing the verification-specific models.

TABLE 1

Utterance Verification Performance

| Method | False Rej. (%) | False Alarm (%) | Post-Rej. Error (%) |
|---|---|---|---|
| SB-MVE | 7.0 | 13.0 | 1.6 |
| On-Line Garb. | 7.0 | 29.1 | 2.8 |
| Free Decoding | 7.0 | 36.8 | 2.5 |
| SB-MVE | 10.0 | 8.0 | 1.2 |
| On-Line Garb. | 10.0 | 15.7 | 2.0 |
| Free Decoding | 10.0 | 22.1 | 2.0 |

TABLE 2

Equal Error Rate Comparison

| Method | ERR (%) |
|---|---|
| SB-MVE | 9.2 |
| ON-line Garb. | 11.8 |
| Free Decoding | 13.7 |

The above-described embodiment of the invention is merely one example of a way in which the invention may be carried out. Other ways may also be possible and are within the scope of the following claims defining the invention.

APPENDIX
SUBWORD-BASED MINIMUM VERIFICATION ERROR (SB-MVE) TRAINING
FOR TASK INDEPENDENT UTTERANCE VERIFICATION

*Rafid A. Sukkar*

Lucent Technologies Bell Laboratories
2000 N. Naperville Rd., Naperville, IL 60566, USA
sukkar@lucent.com

ABSTRACT

In this paper we formulate a training framework and present a method for task independent utterance verification. Verification-specific HMMs are defined and discriminatively trained using minimum verification error training. Task independence is accomplished by performing the verification on the subword level and training the verification models using a general phonetically balanced database that is independent of the application tasks. Experimental results show that the proposed method significantly outperforms two other commonly used task independent utterance verification techniques. It is shown that the equal error rate of false alarms and false keyword rejection is reduced by more than 22% compared to the other two methods on a large vocabulary recognition task.

1. INTRODUCTION

One of the main features of subword-based speech recognition is that, if the acoustic subword models are trained in a task independent fashion, then the recognizer can reliably be applied to many different tasks without the need for retraining. In such a case, only the language model needs to be updated. Recent advances in speech recognition technology have enabled the development of very large vocabulary systems, where it is almost impossible to use anything but subword-based acoustic modeling. With any deployable speech recognition system comes the need for utterance verification to reliably identify and reject out-of-vocabulary speech and extraneous sounds. Task independent utterance verification is therefore very desirable to complement task independent subword-based recognition.

Certain methods for task independent utterance verification have been proposed. For example in [1] an "on-line garbage" likelihood is computed and a likelihood ratio is then formed between the "on-line garbage" likelihood and the likelihood of the recognized word, phrase, or sentence. In [2] a linear discriminator is defined and trained to construct a subword level verification score that is incorporated into a string (sentence) level verification score. Another method that has been used is based on forming a likelihood ratio test between the likelihood of a free subword decoder and the likelihood of the recognized sentence [2,3].

In this paper we present a new method for task independent utterance verification. This method is a generalization of the method presented in [2]. While in [2], linear discrimination is employed for the verification task, in this work we define and discriminatively train verification-specific HMMs, separate from the recognition HMMs, to perform subword level verification. We formulate a subword-based minimum verification error (SB-MVE) training and use it to train these HMMs. Verification is first performed on the subword level and then, in a second stage, on the phrase or sentence level. In this fashion, we can accomplish task independence since the verification models are subword-based and trained in a task independent mode. This SB-MVE formulation extends the word-based minimum verification error (WB-MVE) training introduced in [4].

The organization of this paper is as follows: In the next section we formulate the subword-based verification problem, and in Section 3 we describe the SB-MVE training procedure. Experimental results are given in Section 4 followed by conclusions in Section 5.

2. FORMULATION

Given input speech to an HMM recognizer, let $W_k$ be the most likely word, or string of words obtained by Viterbi decoding. In the context of subword recognition, $W_k$ is a concatenation of subword units which can be written as $$W_k = s_1^{(k)} s_2^{(k)} \cdots s_{N_k}^{(k)} \qquad (1)$$

where the subword string $s_1^{(k)} s_2^{(k)} \cdots s_{N_k}^{(k)}$ is the subword lexical representation of $W_k$, and $N_k$ is the number of subword units comprising $W_k$. Assuming independence among subword units, maximum likelihood Viterbi decoding implies that we can write the likelihood of the observation sequence, O, given $W_k$ as, $$L(O|W_k) = \max_{t_1, t_2, \cdots, t_{N-1}} L(O_{t_0}^{t_1}|s_1^{(k)}) L(O_{t_1}^{t_2}|s_2^{(k)}) \cdots L(O_{t_{N-1}}^{t_N}|s_{N_k}^{(k)}). \qquad (2)$$

where O is the total observation sequence, $O_{t_{j-1}}^{t_j}$ is the observation sequence between time $t_{j-1}$ and $t_j$ corresponding to the speech segment for subword unit $s_j^{(k)}$, and $L(\mathbf{O}_{t_{j-1}}^{t_j} | s_j^{(k)})$ is the likelihood of the segment $\mathbf{O}_{t_{j-1}}^{t_j}$ given $s_j^{(k)}$.

Given the most likely subword string corresponding to the recognition output, $W_k$, we now would like to test the hypothesis that the input speech does indeed consist of $W_k$. To perform this utterance verification task, we employ statistical hypothesis testing by formulating a likelihood ratio test as follows:

$$T(\mathbf{O}; W_k) = \frac{L(\mathbf{O}|H_0(W_k))}{L(\mathbf{O}|H_1(W_k))}, \qquad (3)$$

where $L(\mathbf{O}|H_0(W_k))$ is the likelihood of the observation sequence given the null hypothesis that $W_k$ was spoken, and $L(\mathbf{O}|H_1(W_k))$ is the likelihood of the observation sequence given the alternate hypothesis that $W_k$ was not spoken. The hypothesis test is performed by comparing the likelihood ratio, $T(\mathbf{O}; W_k)$, to a predefined critical threshold, $r_k$. The region $T(\mathbf{O}; W_k) \geq r_k$ is called the acceptance region, and the region $T(\mathbf{O}; W_k) < r_k$ is called the critical rejection region. As a result, two types of errors can occur: false rejection (Type I) errors, and false acceptance or false alarm (Type II) errors. A given critical threshold value implies certain false rejection and false alarm rates. Tradeoff between the two types of errors can be controlled by varying $r_k$.

Rather than dealing with the likelihood ratio directly, it is more convenient to use the log likelihood ratio which can be written as $$\begin{aligned} G(\mathbf{O}, W_k) &= \log T(\mathbf{O}; W_k) \\ &= \log L(\mathbf{O}|H_0(W_k)) - \log L(\mathbf{O}|H_1(W_k)). \end{aligned} \qquad (4)$$

Since $W_k$ consists of a string of $N_k$ subwords according to equation (1), we will represent $G(\mathbf{O}; W_k)$ as an average of $N_k$ log likelihood ratios corresponding to the individual subwords in $W_k$, as follows:

$$G(\mathbf{O}; W_k) = \frac{1}{N} \sum_{j=1}^{N_k} \log T(\mathbf{O}_{t_{j-1}}^{t_j}; s_j^{(k)}), \qquad (5)$$

where $$T(\mathbf{O}_{t_{j-1}}^{t_j}; s_j^{(k)}) = \frac{L(\mathbf{O}_{t_{j-1}}^{t_j} | H_0(s_j^{(k)}))}{L(\mathbf{O}_{t_{j-1}}^{t_j} | H_1(s_j^{(k)}))}, \quad 1 \leq j \leq N_k. (6)$$

Here $H_0(s_j^{(k)})$ is the hypothesis that the segment $\mathbf{O}_{t_{j-1}}^{t_j}$ consists of the correct sound for subword $s_j^{(k)}$, and $H_1(s_j^{(k)})$ is the hypothesis that the segment $\mathbf{O}_{t_{j-1}}^{t_j}$ consists of a different sound. To simplify the notation and without loss of generality, we will drop the superscript $(k)$ from $s_j^{(k)}$ and represent $\mathbf{O}_{t_{j-1}}^{t_j}$ as $\mathbf{O}_j$.

Since the probability densities corresponding to the likelihoods of equation (6) are not known, we will approximate them by defining and discriminatively training verification-specific HMMs for each subword in the recognizer subword set. Therefore, using the simplified notation, we can write equation (6) as $$T(\mathbf{O}_j; s_j) = \frac{L(\mathbf{O}_j | \lambda_j)}{L(\mathbf{O}_j | \psi_j)}, \qquad (7)$$

where $\lambda_j$ and $\psi_j$ are the HMM models corresponding to the null and alternate hypotheses for word $s_j$, respectively. Note that $\lambda_j$ and $\psi_j$ are HMMs that are different than the HMMs used during the recognition process. Considering the likelihood ratio of equation (7), we can view $\lambda_j$ as a verification-specific subword model for subword $s_j$ and $\psi_j$ as a verification-specific anti-subword model for subword $s_j$. This viewpoint is underscored by the fact that we use MVE training to determine the parameters of $\lambda_j$ and $\psi_j$. We denote the verification-specific model set for a given subword, $s_j$, as $\mathcal{V}_j = \{\lambda_j, \psi_j\}$.

3. SUBWORD BASED MINIMUM VERIFICATION ERROR (SB-MVE) TRAINING

Discriminative training is employed to determine the parameters of the verification model set, $\mathcal{V}_j$, for each of the subwords in the recognizer subword set. Based on the definition of the subword likelihood ratio given in equation (7), the goal of the discriminative training is to make $L(\mathbf{O}_j|\lambda_j)$ large compared to $L(\mathbf{O}_j|\psi_j)$ when there is a correct recognition, and to make $L(\mathbf{O}_j|\psi_j)$ large compared to $L(\mathbf{O}_j|\lambda_j)$ when there is a misrecognition.

We define a distance function by taking the log of the inverse subword likelihood ratio of equation (7) as follows:

$$d(\mathbf{O}_j; s_j) = -\log L(\mathbf{O}_j|\lambda_j) + \log L(\mathbf{O}_j|\psi_j). \qquad (8)$$

The training procedure iteratively adjusts the parameters of $\mathcal{V}_j$ by minimizing $d(\mathbf{O}_j; s_j)$ in the case of a correct recognition and maximizing it in the case of a misrecognition.

The function, $d(\mathbf{O}_j; s_j)$, is optimized using the generalized probabilistic descent framework [5]. In such a framework, $d(\mathbf{O}_j; s_j)$ is incorporated into a smooth loss function that is conducive to applying a gradient descent procedure to iteratively adjust the parameters of $\mathcal{V}_j$. Specifically, the loss function gives a measure of the verification error rate for a given $s_j$ and takes the form of a sigmoid function which is written as $$Q(\mathbf{O}_j; s_j) = \frac{1}{1 + \exp[-b \, \mu \, d(\mathbf{O}_j; s_j)]}, \qquad (9)$$

where $\mu$ is a positive constant controlling the smoothness of the sigmoid function, and $b$ is set to 1 in the case of a correct recognition and to $-1$ in the case of a misrecognition. The value for $\mu$ is set to 1.0 in our experiments. The loss function in equation (9) is iteratively minimized with respect to the parameters of $\mathcal{V}_j$ using gradient descent. In our experiments, correct recognitions are obtained during SB-MVE training by force segmenting a given sentence using its correct lexical transcription. Misrecognitions are obtained by force segmenting a given sentence using a random lexical transcription. We set $b$ to $-1$ for all subwords corresponding to a misrecognition and to 1 for all subwords corresponding to a correct recognition.

It is important to note here that task independence is accomplished by training $\mathcal{V}_j$ using a general phonetically balanced subword database. Given that the set of subwords remains the same, the resulting $\mathcal{V}_j$ can be used to perform utterance verification for any recognition task without the need for retraining.

4. EXPERIMENTAL RESULTS

This vocabulary independent utterance verification method was evaluated on a *company name* recognition task, where the goal is to recognize the name of a company out of 6963 possible names. The average number of words per company name is 3.7 words and the average number of subword units per company name is 18.9 units. The lexical transcription of the company names were obtained using a text-to-speech front end. A total of 40 context independent subword models and one silence model were used in the recognition phase. Each subword model was represented by a 3-state continuous density HMM, where the maximum number of Gaussian mixtures was set to 16. The silence model was represented by a single state HMM with 32 mixtures. The recognizer feature vector consisted of the following 39 parameters: 12 LPC derived cepstral coefficients, 12 delta cepstral coefficients, 12 delta-delta cepstral coefficients, normalized log energy, and the delta and delta-delta of the energy parameter. The database used to train these recognition models consisted of 9865 phonetically balanced phrases and sentences collected over the public telephone network. Minimum classification error (MCE) training was employed to train the recognition subword models [5]. The above phonetically balanced database was also used to train the verification models using the SB-MVE training procedure described in Section 3. The verification model set, $\mathcal{V}_j$, for a given subword, $s_j$, consists of two continuous density HMMs, $\lambda_j$ and $\psi_j$, having a topology of 3 states with 8 Gaussian mixtures in each state. Therefore, there were a total of 80 verification HMMs corresponding to the 40 recognition subwords.

The company name database used for performance evaluation is independent of the phonetically balanced database used in the training phase. This testing database was collected over the public telephone network and consists of 11552 utterances spoken by 2500 different speakers covering the 6963 company names. Since we are evaluating the performance of an utterance verification method, we also need to define a separate database consisting of out-of-vocabulary speech. Towards this end, we used a database consisting of 10511 utterances of speakers saying their first and last names. This out-of-vocabulary database was also collected over the public telephone network.

Prior to the utterance verification stage, the recognition rate on the company name database was 93.1%. The utterance verification performance is shown in Figure 1. The top plot in this figure shows the false acceptance rate (false alarms) of the out-of-vocabulary utterances as a function of the false rejection rate of the company name utterances. Since successful recognition requires not only correct verification but also correct classification, the bottom plot shows the recognizer substitution error rate on non-rejected company names versus false rejection rate. By fixing the false rejection rate, the recognizer operating point can be determined by identifying the corresponding false alarm and substitution error rates. The SB-MVE performance at any given operating point is obtained by evaluating the verification score, $G(\mathbf{O};W_k)$, given in equation (5), and comparing the results to a predefined threshold.

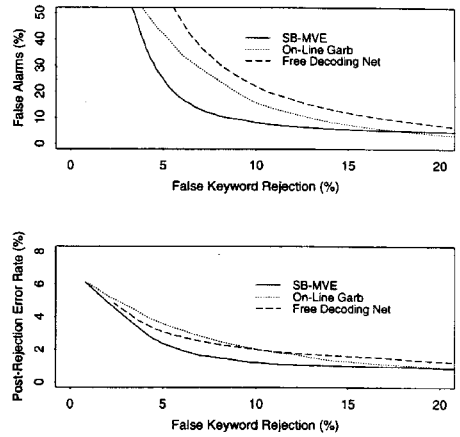

Figure 1. Utterance verification performance comparison.

Figure 1 also compares the performance of the SB-MVE method to two other utterance verification methods. The first is very similar to the on-line garbage method, proposed in [1] and also evaluated in [3]. In our experiments the on-line garbage verification score for a given recognized company name is computed by averaging the on-line garbage scores of the subwords constituting the recognized company name excluding any silence segments. It is useful to note that the SB-MVE method also excludes all silence segments when computing the verification score. Mathematically, the on-line verification score that we used to obtain the on-line garbage performance shown in Figure 1 is given by $$R(\mathbf{O};W_k) = \frac{1}{N_k}\sum_{j=1}^{N_k}\log\frac{L(\mathbf{O}_{t_{j-1}}^{t_j}|s_j^{(k)})}{L_{on-line}(\mathbf{O}_{t_{j-1}}^{t_j})}, \quad (10)$$

where $L_{on-line}(\mathbf{O}_{t_{j-1}}^{t_j})$ is the on-line garbage likelihood obtained by computing for every frame the average likelihood score of the $M$ top scoring states and summing over the segment $\mathbf{O}_{t_{j-1}}^{t_j}$. In our experiments $M$ was set to 16.

The second method with which we compared employs a verification HMM network parallel to the HMM network defined by the company name lexicon. The verification network acts as the out-of-vocabulary network and consists of a self loop of all the subword and silence models in the recognizer model set. In effect, this out-of-vocabulary network results in a "free-subword" maximum likelihood HMM decoding of the input speech utterance. The verification score is defined as a log likelihood difference between the likelihood of the recognized company name and the likelihood of the non-keyword network.

It is clear from Figure 1 that the SB-MVE method significantly outperforms the other methods on two fronts. First, the SB-MVE method results in a false alarms rate that is consistently lower than the other two methods. Second, the post-rejection substitution error rate is also lower, implying that the SB-MVE method is more likely than the other two methods to reject substitution errors, a very desirable property for many applications. Fixing the false rejection rate at 7.0% and 10.0%, Table 1 shows a comparison of the utterance verification performance of the three methods. These results were obtained from the plots of Figure 1. Another point of interest is the equal error rate (EER) of false alarms and false rejections. Table 2 compares the equal error rates of the three methods and shows that the SB-MVE method results in an EER that is 22.0% lower than the on-line garbage method and 32.8% lower than the free decoding network method.

Table 1. Utterance verification performance

| Method | False Rej. (%) | False Alarms (%) | Post-Rej. Error (%) |
|---|---|---|---|
| SB-MVE | 7.0 | 13.0 | 1.6 |
| On-Line Garb. | 7.0 | 29.1 | 2.8 |
| Free Decoding | 7.0 | 36.8 | 2.5 |
| SB-MVE | 10.0 | 8.0 | 1.2 |
| On-Line Garb. | 10.0 | 15.7 | 2.0 |
| Free Decoding | 10.0 | 22.1 | 2.0 |

It is important to note that the free decoding method is much more computationally intensive that either the SB-MVE or the on-line garbage method. On the other hand the difference in computational complexity between the SB-MVE and on-line garbage method is relatively small. The SB-MVE method does, however, require additional model storage capacity compared to the other two methods for storing the verification-specific models.

Table 2. Equal error rate comparison

| Method | EER (%) |
|---|---|
| SB-MVE | 9.2 |
| On-Line Garb. | 11.8 |
| Free Decoding | 13.7 |

5. CONCLUSIONS

In this paper we formulated a framework and presented a method for task independent utterance verification. Verification-specific models were defined and trained using minimum verification error training. To accomplish task independence, the verification was performed on the subword level and the verification models were trained using a general task independent database that consisted of phonetically balanced phrases and sentences. Comparing this proposed method to two other commonly used utterance verification methods showed that the SB-MVE method reduces the equal error rate of false rejections and false alarms by at least 22%. In addition, the SB-MVE method consistently resulted in lower post-rejection substitution error rate, implying that the SB-MVE method was more likely to reject substitution errors compared to the other two methods.

6. ACKNOWLEDGEMENTS

The author acknowledges helpful discussions with Chin H. Lee regarding minimum verification error training. The author also acknowledges the valuable software support provided by Carl Mitchell.

7. REFERENCES

[1] H. Bourlard, B. D'hoore, and J.-M. Boite "Optimizing recognition and rejection performance in wordspotting systems," Proc. ICASSP '94, pp. 373-376, Vol. 1, April 1994.

[2] R. A. Sukkar, C. H. Lee, and B. H. Juang, "A vocabulary independent discriminatively trained method for rejection of non-keywords in subword-based speech recognition," Proc. Eurospeech '95, pp. 1629-1632, Sept. 1995.

[3] R. C. Rose and E. Lleida, "Speech recognition using automatically derived acoustic baseforms," Proc. ICASSP '97, pp. 1271-1274, April 1997.

[4] R. A. Sukkar, A. R. Setlur, M. G. Rahim, and C. H. Lee, "Utterance verification of keyword strings using Word-Based Minimum Verification Error (WB-MVE) training," Proc. ICASSP '96, Vol. I, pp. 518-521, May 1996.

[5] W. Chou, B. H. Juang, and C. H. Lee, "Segmental GPD training of HMM-based speech recognizer," Proc. ICASSP '92, Vol. I, pp. 473-476, April 1992.

What is claimed is:

1. An automated speech recognition system comprising:
   a speech information preprocessor for receiving a speech signal and responsively producing at least one speech feature signal descriptive of said speech signal;
   a speech recognition component responsive to said speech feature signal to produce a speech recognition hypothesis indicating which member of a predefined group of sound units most probably corresponds to speech content of said speech signal; and
   an utterance verification component responsive to said speech recognition hypothesis and said speech feature signal for producing an acceptance signal when said speech content of said speech signal includes said speech recognition hypothesis;
   said utterance verification component having a first subword acoustic model distinct from any acoustic model used to produce said speech recognition hypothesis for determining a first likelihood that a speech segment contains a sound corresponding to said speech recognition hypothesis;
   said utterance verification component having a second subword acoustic model for determining a second likelihood that a speech segment contains a sound other than one corresponding to said speech recognition hypothesis;
   wherein said first and second subword acoustic models have been trained through obtaining correct recognitions by force-segmenting sample sentences using a correct lexical transcription, obtaining incorrect recognitions by force-segmenting sample sentences using an incorrect lexical transcription, and for each subword in a sample sentence adjusting parameters of each of said first and second subword acoustic models according to whether recognition of such subword was correct.

2. The system of claim 1 wherein at least one of said first and second subword acoustic models is prepared using minimum verification error training.

3. The system of claim 1 wherein said first and second subword acoustic models are prepared using discriminative training.

4. The system of claim 1 wherein said first and second subword acoustic models are Hidden Markov Models prepared using discriminative subword-based minimum verification error training.

5. The system of claim 1 wherein said utterance verification component further comprises a subword verification score generator responsive to said first and second likelihoods to determine for a subword-sized speech segment a subword verification score indicating whether speech content of said speech segment includes a speech content equivalent to a speech recognition hypothesis produced by said speech recognition component and corresponding to said speech segment.

6. The system of claim 1 wherein said utterance verification component further comprises a combiner responsive to a plurality of subword verification scores for producing a larger-speech-unit verification score indicative of the extent to which speech content of speech segments corresponding to said plurality of subword verification scores is equivalent to a speech larger-speech-unit-sized recognition hypothesis produced by said speech recognition component and corresponding to said speech segments.

7. The system of claim 6 wherein said utterance verification component further comprises a threshold component responsive to said larger-speech-unit verification score and a predetermined threshold to produce an acceptance signal indicating when said threshold is satisfied that said speech content of said speech segments corresponding to said plurality of subword verification scores is equivalent to said larger-speech-unit-sized speech recognition hypothesis produced by said speech recognition component and corresponding to said speech segments.

8. An utterance verification system for use in speech recognition comprising:
   means for receiving at least one speech feature signal descriptive of an acquired speech signal;
   means for receiving a speech recognition hypothesis indicating which member of a predefined group of sound units most probably corresponds to speech content of said speech signal;
   a first subword acoustic model distinct from any acoustic model used to produce said speech recognition hypothesis for determining a first likelihood that a speech segment contains a sound corresponding to said speech recognition hypothesis;
   a second subword acoustic model for determining a second likelihood that a speech segment contains a sound other than one corresponding to said speech recognition hypothesis; and
   means responsive to said speech feature signal, said speech recognition hypothesis, and said first and second subword acoustic models for producing an acceptance signal when said speech content of said speech signal includes said speech recognition hypothesis;
   wherein said first and second subword acoustic models have been trained through obtaining correct recognitions by force-segmenting sample sentences using a correct lexical transcription, obtaining incorrect recognitions by force-segmenting sample sentences using an incorrect lexical transcription, and for each subword in a sample sentence adjusting parameters of each of said first and second subword acoustic models according to whether recognition of such subword was correct.

9. The system of claim 8 wherein at least one of said first and second subword acoustic models is prepared using minimum verification error training.

10. The system of claim 8 wherein said first and second subword acoustic models are prepared using discriminative training.

11. The system of claim 8 wherein said first and second subword acoustic models are Hidden Markov Models prepared using discriminative subword-based minimum verification error training.

12. The system of claim 8 further comprising:
    a subword verification score generator responsive to said first and second likelihoods to determine for a subword-sized speech segment a subword verification score indicating whether said speech segment includes a speech content equivalent to a subword-sized speech recognition hypothesis corresponding to said speech segment.

13. The system of claim 8 further comprising:
    a combiner responsive to a plurality of subword verification scores for producing a larger-speech-unit verification score indicative of the extent to which speech content of speech segments corresponding to said plurality of subword verification scores is equivalent to a larger-speech-unit-sized speech recognition hypothesis corresponding to said speech segments.

14. The system of claim 13 further comprising:
    a threshold component responsive to said larger-speech-unit verification score and a predetermined threshold to produce an acceptance signal indicating when said threshold is satisfied said speech content of said speech segments corresponding to said plurality of subword verification scores is equivalent to said larger-speech-unit-sized speech recognition hypothesis corresponding to said speech segments.

15. A method for task-independent speech recognition comprising the steps of:

receiving a speech signal;

processing said speech signal into feature signals descriptive of speech content of said speech signal;

processing said feature signals to produce a speech recognition hypothesis;

producing for each subword contained in said speech recognition hypothesis a subword verification score, including processing each speech segment corresponding to each such subword using a first subword acoustic Hidden Markov Model, which is distinct from any acoustic model used in producing said speech recognition hypothesis, to produce a first subword verification likelihood and a second anti-subword acoustic Hidden Markov Model to produce a second subword verification likelihood;

combining subword verification scores corresponding to all subwords contained in said speech recognition hypothesis to form a larger-speech-unit verification score;

comparing said larger-speech-unit verification score to a predefined threshold, and if said threshold is satisfied, producing an accept signal indicating that the speech recognition hypothesis is contained in said speech signal;

wherein said first subword and said second anti-subword acoustic models have been trained through obtaining correct recognitions by force-segmenting sample sentences using a correct lexical transcription, obtaining incorrect recognitions by force-segmenting sample sentences using an incorrect lexical transcription, and for each subword in a sample sentence adjusting parameters of each of said first and second subword acoustic models according to whether recognition of such subword was correct.

16. The method of claim 15 further comprising the step of delivering as an output said speech recognition hypothesis.

17. The method of claim 15 further comprising the step of producing, if said threshold is not satisfied, a reject signal indicating that the speech recognition hypothesis is not contained in said speech signal.

18. The method of claim 15 wherein said step of producing said subword verification score further comprises the step of determining said subword verification score as a log likelihood ratio of said first subword verification likelihood to said second subword verification likelihood.

19. A method of training a task-independent utterance verification system comprising the steps of:

preparing a verification model set having a verification-specific subword model and a verification-specific anti-subword model for each subword in a recognizer subword set;

using said verification model set, determining for a selected subword as the log of the ratio of the likelihood produced from said verification-specific subword model to the likelihood produced from said verification-specific anti-subword model;

determining parameters of said verification model set by discriminatively training said verification-specific subword model and said verification-specific anti-subword model;

wherein said parameter determining step further comprises the steps of:

obtaining a training set comprising many sample utterances including subwords in the recognizer subword set;

obtaining correct recognitions by force-segmenting sample sentences using a correct lexical transcription;

obtaining incorrect recognitions by force-segmenting a sample sentence using a random lexical transcription;

for each subword in a sample sentence, determining whether the recognition of said subword is correct; and adjusting parameters of said verification model set accordingly.

20. The method of claim 19 wherein said parameter adjusting step further comprising the step of:

if the recognition of said subword is correct, adjusting parameters of said verification model set to maximize a ratio of a likelihood produced by said verification-specific subword model to a likelihood produced by said verification-specific anti-subword model for such subword.

21. The method of claim 19 wherein said parameter adjusting step further comprising the step of:

if the recognition of said subword is incorrect, adjusting parameters of said verification model set to maximize a ratio of a likelihood produced by said verification-specific anti-subword model to a likelihood produced by said verification-specific subword model for such subword.

22. An automated speech recognition system comprising:

a speech information preprocessor for receiving a speech signal and responsively producing at least one speech feature signal descriptive of said speech signal;

a speech recognition component responsive to said speech feature signal to produce a speech recognition hypothesis indicating which member of a predefined group of sound units most probably corresponds to speech content of said speech signal; and an utterance verification component responsive to said speech recognition hypothesis and said speech feature signal for producing an acceptance signal when said speech content of said speech signal includes said speech recognition hypothesis;

said utterance verification component having a first subword acoustic model distinct from any acoustic model used to produce said speech recognition hypothesis for determining a first likelihood that a speech segment contains a sound corresponding to said speech recognition hypothesis;

said utterance verification component having a second subword acoustic model for determining a second likelihood that a speech segment contains a sound other than one corresponding to said speech recognition hypothesis;

and further comprising means for training said first and second subword acoustic models, said means for training having:

means for obtaining correct recognitions by force-segmenting sample sentences using a correct lexical transcription;

means for obtaining incorrect recognitions by force-segmenting sample sentences using an incorrect lexical transcription; and means for determining for each subword in a sample sentence whether recognition of such subword was correct and adjusting parameters of each of said first and second subword acoustic models accordingly.

23. An utterance verification system for use in speech recognition comprising:

- means for receiving at least one speech feature signal descriptive of an acquired speech signal;
- means for receiving a speech recognition hypothesis indicating which member of a predefined group of sound units most probably corresponds to speech content of said speech signal;
- a first subword acoustic model distinct from any acoustic model used to produce said speech recognition hypothesis for determining a first likelihood that a speech segment contains a sound corresponding to said speech recognition hypothesis;
- a second subword acoustic model for determining a second likelihood that a speech segment contains a sound other than one corresponding to said speech recognition hypothesis;
- means responsive to said speech feature signal, said speech recognition hypothesis, and said first and second subword acoustic models for producing an acceptance signal when said speech content of said speech signal includes said speech recognition hypothesis; and
- means for training said first and second subword acoustic models, including:
- means for obtaining correct recognitions by force-segmenting sample sentences using a correct lexical transcription;
- means for obtaining incorrect recognitions by force-segmenting sample sentences using an incorrect lexical transcription; and
- means for determining for each subword in a sample sentence whether recognition of such subword was correct and adjusting parameters of each of said first and second subword acoustic models accordingly.

24. A method of training a task-independent utterance verification system comprising the steps of:

- preparing a verification model set having a verification-specific subword model and a verification-specific anti-subword model for each subword in a recognizer subword set;
- determining parameters of said verification model set by training said verification-specific subword model and said verification-specific anti-subword model;
- wherein said parameter determining step further comprises the steps of:
- obtaining a training set comprising many sample utterances including subwords in the recognizer subword set;
- obtaining correct recognitions by force-segmenting sample sentences using a correct lexical transcription;
- obtaining incorrect recognitions by force-segmenting a sample sentence using an incorrect lexical transcription;
- for each subword in a sample sentence, determining whether the recognition of said subword is correct; and
- adjusting parameters of said verification model set accordingly.

* * * * *